United States Patent
Lee et al.

(10) Patent No.: US 7,793,502 B2
(45) Date of Patent: Sep. 14, 2010

(54) APPARATUS AND METHOD FOR LIQUEFIED NATURAL GAS CARRIER PROPULSION

(75) Inventors: Jung Han Lee, Geoje-si (KR); Jin Kwang Lee, Geoje-si (KR); Kwan Won Son, Seoul (KR); Jeoung Sun Lee, Bucheon-si (KR); Jin Hyo Kim, Geoje-si (KR)

(73) Assignee: Daewoo Shipbuilding & Marine Engineering Co., Ltd., Seoul (KR)

( * ) Notice: Subject to any disclaimer, the term of this patent is extended or adjusted under 35 U.S.C. 154(b) by 309 days.

(21) Appl. No.: 11/873,318

(22) Filed: Oct. 16, 2007

(65) Prior Publication Data

US 2008/0209908 A1  Sep. 4, 2008

(30) Foreign Application Priority Data

Jan. 17, 2007  (KR)  ............... 10-2007-0005338

(51) Int. Cl.
*F01B 21/04* (2006.01)
(52) U.S. Cl. .................................... 60/716; 60/719
(58) Field of Classification Search ............ 60/716–720
See application file for complete search history.

(56) References Cited

U.S. PATENT DOCUMENTS

| | | | | |
|---|---|---|---|---|
| 3,565,201 | A * | 2/1971 | Petsinger | 180/69.5 |
| 5,147,005 | A * | 9/1992 | Haeggstrom | 180/69.5 |
| 5,616,056 | A * | 4/1997 | Meissner | 440/3 |
| 6,023,942 | A * | 2/2000 | Thomas et al. | 62/613 |
| 6,202,707 | B1 | 3/2001 | Woodall et al. | 141/1 |
| 6,223,557 | B1 * | 5/2001 | Cole | 62/613 |
| 6,672,104 | B2 * | 1/2004 | Kimble et al. | 62/613 |
| 7,047,899 | B2 | 5/2006 | Laurilehto et al. | 114/248 |

FOREIGN PATENT DOCUMENTS

| | | |
|---|---|---|
| CN | 1107834 C | 5/2003 |
| CN | 1654274 A | 8/2005 |
| JP | 57179589 U | 11/1982 |
| JP | 4046892 A | 2/1992 |
| JP | 8230785 A | 9/1996 |
| JP | 2001132898 A | 5/2001 |
| KR | 04-046892 A | 2/1992 |
| WO | 2006051315 A1 | 5/2006 |

OTHER PUBLICATIONS

Chinese Office Action dated Nov. 28, 2008, relating to Chinese Patent Application No. 2007100969941, 7 pages.

* cited by examiner

*Primary Examiner*—Hoang M Nguyen
(74) *Attorney, Agent, or Firm*—Seed IP Law Group PLLC

(57) ABSTRACT

Disclosed herein is an apparatus and method for liquefied natural gas (LNG) carrier propulsion. In the apparatus and method, the propulsion of an LNG carrier is done by only a single main diesel engine and has construction to promptly cope with emergencies caused by malfunction of the main diesel engine. The propulsion apparatus for an LNG carrier comprising a boil-off gas re-liquefaction apparatus for re-liquefying boil-off gas generated in LNG storage tanks to return re-liquefied boil-off gas back to the LNG storage tank comprises a single main diesel engine, a propulsion shaft separably connected to the main diesel engine, and an electric motor for propulsion separably connected to the propulsion shaft and supplied with power intended for operation of the boil-off gas re-liquefaction apparatus.

9 Claims, 3 Drawing Sheets

APPARATUS AND METHOD FOR LIQUEFIED NATURAL GAS CARRIER PROPULSION

BACKGROUND

1. Technical Field

The present invention relates generally to an apparatus and method for liquefied natural gas (LNG) carrier propulsion, and more particularly to an apparatus and method for propulsion of an LNG carrier that comprises a boil-off gas re-liquefaction apparatus and a diesel engine propulsion system.

2. Description of the Related Art

Generally, liquefied natural gas (LNG) is produced by cooling natural gas into a cryogenic liquid state at a production terminal and transported by LNG carriers to distant locations where it is to be regasified.

Since the liquefaction of natural gas occurs at a cryogenic temperature of approximately −163 degrees Celsius at ambient pressure, LNG is likely to be vaporized if the temperature of LNG increases above −163 degrees Celsius at ambient pressure. Although an LNG storage tank for the LNG carrier is equipped with thermal insulation structure, it is impossible to completely prevent heat ingress to LNG through the storage tank, and as a result, LNG is consistently vaporized and boil-off gas is generated in the LNG storage tank during LNG transportation.

A conventional LNG carrier employs a steam turbine propulsion system, which is driven by steam obtained by burning boil-off gas in a boiler. However, such a steam turbine propulsion system has a drawback of low propulsion efficiency.

On the other hand, in the case where boil-off gas is not used as fuel for propulsion of an LNG carrier, it is possible to increase the economic values of the boil-off gas by recycling it back to the storage tank. For this purpose, diesel engine propulsion with a re-liquefaction system has been developed, which has a boil-off gas re-liquefaction apparatus installed in the LNG carrier to return boil-off gas back to the storage tank and includes a diesel engine having high propulsion efficiency as the main propulsion source.

Especially for LNG carriers, to maintain the high reliability, the LNG carriers are required to have countermeasures against emergencies, such as the malfunction of main diesel engines in the diesel engine propulsion system. Furthermore, since it is necessary to install two main diesel engines in the prior art, the diesel engine propulsion system has problems in that the construction of an LNG carrier is complicated and initial and maintenance costs are increased.

BRIEF SUMMARY

Therefore, the present invention has been made in view of the above problems, and an object of the present invention is to provide an apparatus and method for LNG carrier propulsion with only a single main diesel engine and construction to promptly cope with emergencies caused by malfunction of the main diesel engine.

In accordance with an aspect of the present invention, the above and other objects can be accomplished by the provision of a propulsion apparatus for an LNG carrier comprising a boil-off gas re-liquefaction apparatus for re-liquefying boil-off gas generated in an LNG storage tank to return the re-liquefied boil-off gas back to the LNG storage tank, the apparatus comprising: a single main diesel engine; a propulsion shaft separably connected to the main diesel engine; and an electric motor for propulsion separably connected to the propulsion shaft and supplied with power intended for operation of the boil-off gas re-liquefaction apparatus.

In accordance with another aspect of the present invention, a method for propelling an LNG carrier comprising a boil-off gas re-liquefaction apparatus for re-liquefying boil-off gas generated in an LNG storage tank to return the re-liquefied boil-off gas back to the LNG storage tank is provided, comprising: propelling the LNG carrier with power from a single main diesel engine during normal operation, and, in case of main diesel engine malfunction, propelling the LNG carrier by the electric motor with power intended for boil-off gas re-liquefaction apparatus while disconnecting power transmission from the main engine.

BRIEF DESCRIPTION OF THE SEVERAL VIEWS OF THE DRAWINGS

The above and other objects, features and advantages of the present invention will become apparent from the following description of preferred embodiments given in conjunction with the accompanying drawings, in which.

DETAILED DESCRIPTION

Exemplary embodiments of the present invention will be described in detail with reference to the accompanying drawings hereinafter.

Figure 1:
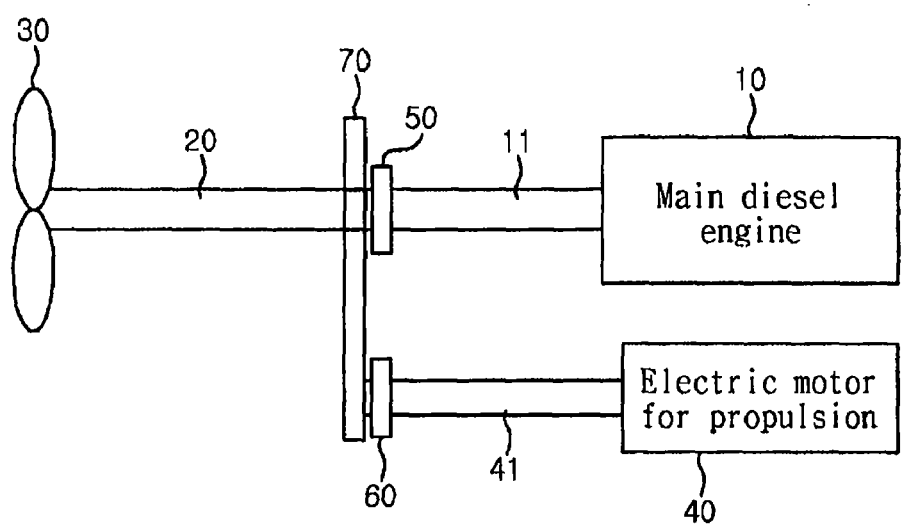
FIG. 1 is a schematic view illustrating a propulsion apparatus for an LNG carrier according to an exemplary embodiment of the present invention.
Figure 3:
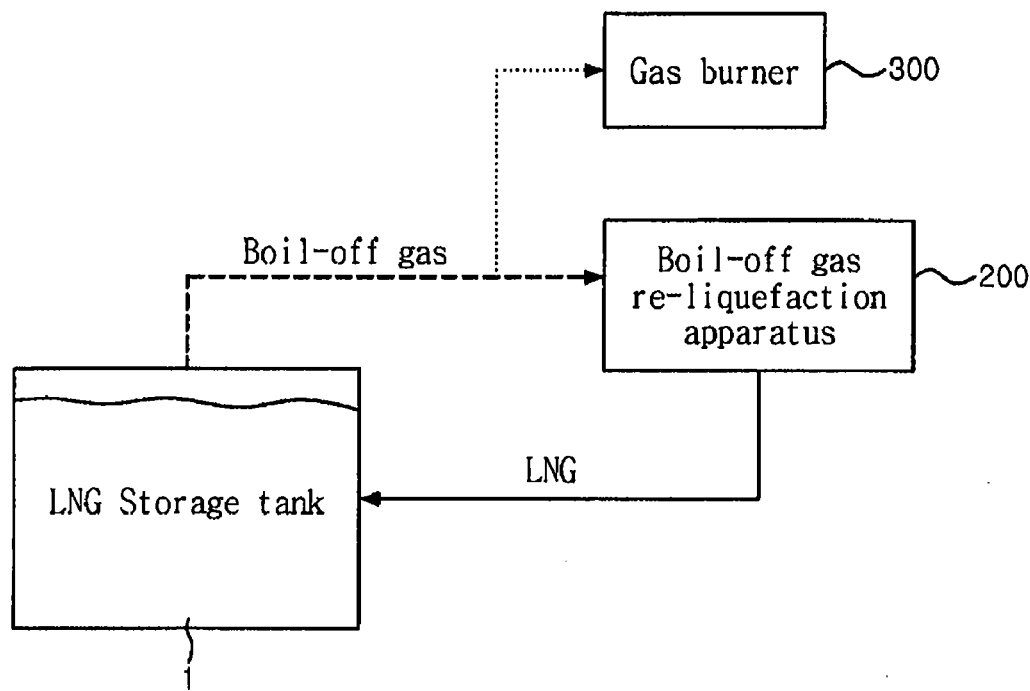
FIG. 3 is a schematic diagram illustrating a process of treating boil-off gas in the LNG carrier according to the exemplary embodiment of the present invention.

FIG. 1 is a schematic view illustrating a propulsion apparatus for an LNG carrier according to an exemplary embodiment of the present invention. As illustrated in FIG. 3, a propulsion apparatus for LNG carriers according to the exemplary embodiment comprises a boil-off gas re-liquefaction apparatus 200 for re-liquefying boil-off gas generated in an LNG storage tank 1 and returning it back to the LNG storage tank 1.

As illustrated in FIG. 1, the propulsion apparatus of the LNG carrier according to the exemplary embodiment comprises a main diesel engine 10, a propulsion shaft 20, a propeller 30, and an electric motor 40 for propulsion.

According to this embodiment, the LNG carrier comprises only a single main diesel engine 10.

The propulsion shaft 20 is separably connected to the main diesel engine 10 with a clutch 50 disposed between the propulsion shaft 20 and a driving shaft 11 of the main diesel engine 10.

The propeller 30 for propelling the LNG carrier is connected to an end of the propulsion shaft 20.

Further, the electric motor 40 for propulsion is separably connected to the propulsion shaft 20 with another clutch 60 disposed between the propulsion shaft 20 and a driving shaft 41 of the electric motor 40. Additionally, a reduction gear 70 is disposed between the driving shaft 41 of the electric motor 40 and the propulsion shaft 20. The reduction gear 70 is connected to the propulsion shaft 20 and reduces the rotating speed of the driving shaft 41 of the electric motor 40.

Figure 2:
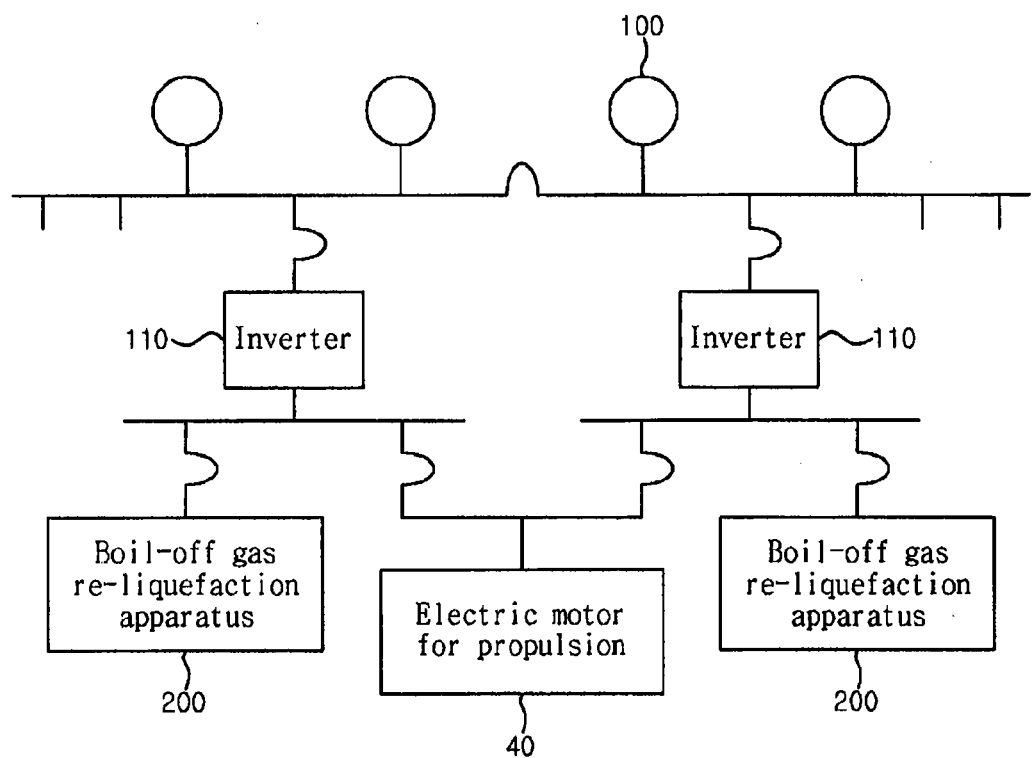
FIG. 2 is a schematic view illustrating the supply of power to an electric motor for propulsion in the propulsion apparatus for the LNG carrier according to the exemplary embodiment of the present invention.

As illustrated in FIG. 2, the electric motor 40 for propulsion is supplied with power intended for operation of the boil-off gas re-liquefaction apparatus 200 supplied from a generator 100, and is connected in parallel to two inverters 110 for the boil-off gas re-liquefaction apparatus 200. As such, when the electric motor 40 for propulsion is connected in parallel to the two inverters 110, it is possible to increase the capability of the electric motor 40 twice.

In addition, it is necessary in the prior art to employ a separate inverter for speed control of the electric motor 40. According to the invention, however, since the inverters for the boil-off gas re-liquefaction apparatus are used as an inverter for the electric motor for propulsion, it is not necessary to add a separate electrical apparatus for the speed control of the electric motor.

As illustrated in FIG. 3, the LNG carrier has a gas burner 300 disposed downstream of the LNG storage tank 1.

Next, a method for propelling an LNG carrier using the propulsion apparatus according to an embodiment of the present invention is described in conjunction with FIGS. 1-3.

In the method for propelling the LNG carrier according to the present invention, a single main diesel engine 10 is connected to a propulsion shaft 20 during normal operation of the main diesel engine 10. On the other hand, upon malfunction of the main diesel engine 10, the main diesel engine 10 is disconnected from the propulsion shaft 20, and at the same time, the electric motor 40, to which power intended for operation of the boil-off gas re-liquefaction apparatus 200 is supplied from a generator 100, is connected to the propulsion shaft 20. Here, during the normal operation of the main diesel engine 10, a clutch 50 is connected between a driving shaft 11 and the propulsion shaft 20, whereas upon malfunction of the main diesel engine 10, the clutch 50 is released from connection between the driving shaft 11 and the propulsion shaft 20 while a clutch 60 is connected between a driving shaft 41 of the electric motor 40 and the propulsion shaft 20.

Upon malfunction of the main diesel engine 10, power supplied from the generator 100 to a boil-off gas re-liquefaction apparatus 200 is cut off to stop operation of the boil-off gas re-liquefaction apparatus 200, and power intended for operation of the boil-off gas re-liquefaction apparatus 200 is supplied to the electric motor 40 for propulsion, so that the electric motor 40 is driven.

In the case where the operation of the boil-off gas re-liquefaction apparatus 200 is stopped, boil-off gas generated in an LNG storage tank 1 is routed to a gas combustion unit or gas burner 300 and burned safely without increasing the storage tank pressure.

As apparent from the above, since the propulsion apparatus and method according to the invention is configured to use an electric motor for propulsion, to which power intended for operation of a boil-off gas re-liquefaction apparatus is supplied, upon malfunction of a main diesel engine, it is possible to promptly cope with emergencies caused by the malfunction of the main diesel engine even though only the single main diesel engine is installed in the propulsion apparatus.

Further, according to embodiments of the present invention, since inverters for the boil-off gas re-liquefaction apparatus can be used as an inverter to drive the electric motor for propulsion upon the emergencies, a separate inverter system is not required for the electric motor, thereby reducing initial installation costs.

Although particular embodiments of the present invention have been shown and described herein, it should be understood that various modifications, variations or corrections may readily occur to those skilled in the art, and thus, the description and drawings herein should be interpreted by way of illustrative purpose without limiting the scope and sprit of the present invention.

What is claimed is:

1. An apparatus comprising:
    a boil-off gas re-liquefaction apparatus for re-liquefying boil-off gas generated in a liquefied natural gas (LNG) carrier LNG storage tank that returns the re-liquefied boil-off gas back to the LNG storage tank;
    a propulsion shaft;
    a main diesel engine separably connected to the propulsion shaft;
    an electric motor for propulsion separably connected to the propulsion shaft, the electric motor being operably coupled to and powered by energy obtained from the boil-off gas re-liquefaction apparatus; and
    a plurality of inverters for the boil-off gas re-liquefaction apparatus connected to the electric motor in parallel.

2. The propulsion apparatus according to claim 1, further comprising:
    a clutch between a driving shaft of the main diesel engine and the propulsion shaft.

3. The propulsion apparatus according to claim 1, further comprising:
    a clutch between a driving shaft of the electric motor for propulsion and the propulsion shaft.

4. The propulsion apparatus according to claim 3, further comprising:
    a reduction gear between the driving shaft of the electric motor and the propulsion shaft.

5. The propulsion apparatus according to claim 1 wherein the electric motor is connected in parallel to two inverters for the boil-off gas re-liquefaction apparatus.

6. The propulsion apparatus according to claim 1 wherein the LNG carrier has a gas burner to incinerate the boil-off gas.

7. A method for propelling an LNG carrier having a boil-off gas re-liquefaction apparatus for re-liquefying boil-off gas generated in an LNG storage tank to return the re-liquefied boil-off gas back to the LNG storage tank, the method comprising:
    propelling the LNG carrier with power from a single main diesel engine during normal operation of the main diesel engine, and
    propelling the LNG carrier with power intended for operation of the boil-off gas re-liquefaction apparatus while disconnecting power transmission from the main engine upon malfunction of the main diesel engine, wherein the power intended for operation of the boil-off gas re-liquefaction apparatus is supplied to an electric motor for propulsion through a plurality of inverters connected in parallel.

8. The method according to claim 7 wherein, upon the malfunction of the main diesel engine, the power is intercepted from being supplied from a generator to the boil-off gas re-liquefaction apparatus to stop operation of the boil-off gas re-liquefaction apparatus, and at the same time, the power intended for the operation of the boil-off gas re-liquefaction apparatus is supplied from the generator to the electric motor for propulsion to drive the electric motor.

9. The method according to claim 8, further comprising:
    routing the boil-off gas to a gas combustion unit or a gas burner such that the boil-off gas can be safely combusted in the case where the operation of the boil-off gas re-liquefaction apparatus is stopped.

* * * * *